United States Patent
Bafna et al.

(10) Patent No.: US 9,935,836 B2
(45) Date of Patent: Apr. 3, 2018

(54) EXCLUSIVE IP ZONE SUPPORT SYSTEMS AND METHOD

(75) Inventors: Paresh Bafna, Maharashtra (IN); Prasanna Kulkarni, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 461 days.

(21) Appl. No.: 13/082,230

(22) Filed: Apr. 7, 2011

(65) Prior Publication Data

US 2012/0259972 A1    Oct. 11, 2012

(51) Int. Cl.
G06F 15/173    (2006.01)
H04L 12/24    (2006.01)
H04L 12/26    (2006.01)

(52) U.S. Cl.
CPC ...... *H04L 41/0853* (2013.01); *H04L 43/0817* (2013.01); *H04L 41/12* (2013.01)

(58) Field of Classification Search
CPC . H04L 12/4675; H04L 49/354; H04L 49/356; G06F 9/5077; G06F 11/301; G06F 12/1036; G06F 12/109; G06F 3/0665
USPC ......................................................... 709/224
See application file for complete search history.

(56) References Cited

U.S. PATENT DOCUMENTS

| | | | |
|---|---|---|---|
| 6,516,350 B1 * | 2/2003 | Lumelsky et al. ............ | 709/226 |
| 6,718,383 B1 * | 4/2004 | Hebert .................... | H04L 45/22 709/221 |
| 6,973,487 B2 * | 12/2005 | Kimura ......................... | 709/221 |
| 6,985,944 B2 * | 1/2006 | Aggarwal ..................... | 709/224 |
| 7,143,153 B1 * | 11/2006 | Black et al. .................. | 709/223 |
| 7,181,523 B2 * | 2/2007 | Sim ............................... | 709/226 |
| 7,181,524 B1 * | 2/2007 | Lele .............................. | 709/226 |
| 7,299,294 B1 * | 11/2007 | Bruck ............... | H04L 29/12216 709/201 |
| 7,921,197 B2 * | 4/2011 | Soundararajan ............. | 709/223 |
| 8,055,735 B2 * | 11/2011 | Krishnappa ............ | G06F 15/16 709/220 |
| 9,311,200 B1 * | 4/2016 | Ngan .................. | G06F 11/1438 |
| 2002/0156612 A1 * | 10/2002 | Schulter et al. ............... | 703/23 |
| 2004/0008727 A1 * | 1/2004 | See et al. ...................... | 370/469 |
| 2004/0068563 A1 * | 4/2004 | Ahuja et al. .................. | 709/225 |

(Continued)

*Primary Examiner* — Moustafa M Meky
*Assistant Examiner* — Blake Rubin
(74) *Attorney, Agent, or Firm* — Patent Law Works LLP

(57) ABSTRACT

Network resource monitoring systems and methods are presented. In one embodiment, a network resource monitoring method comprises: gathering network resource pre-monitoring information, including information indicating whether a network resource is associated with a zone, and if associated with a zone also gathering information indicating zone type; performing a network resource monitoring process on the network resource based on results of the gathered network resource pre-monitoring information; including performing a network resource monitoring process when the network resource is in a local zone that does not otherwise make available or share information with a global zone; and analyzing the results of the network resource monitoring process. In one embodiment, if the network resource is included in an exclusive IP zone. In one exemplary implementation, the network resource monitoring process comprises: ascertaining if a monitoring type trigger condition exists; performing a corresponding type of monitoring if the monitoring type trigger condition exists.

18 Claims, 8 Drawing Sheets

(56) References Cited

U.S. PATENT DOCUMENTS

| | | | |
|---|---|---|---|
| 2004/0133690 A1* | 7/2004 | Chauffour et al. | 709/229 |
| 2005/0013255 A1* | 1/2005 | Knop | H04L 41/0806 370/241 |
| 2005/0066056 A1* | 3/2005 | Dominic | 709/245 |
| 2006/0031476 A1* | 2/2006 | Mathes et al. | 709/224 |
| 2006/0031540 A1* | 2/2006 | Purontaus et al. | 709/229 |
| 2006/0168192 A1* | 7/2006 | Sharma et al. | 709/224 |
| 2007/0028244 A1* | 2/2007 | Landis et al. | 718/108 |
| 2007/0208873 A1* | 9/2007 | Lu et al. | 709/238 |
| 2007/0234116 A1* | 10/2007 | Yoshikawa et al. | 714/13 |
| 2007/0289008 A1* | 12/2007 | Andreev | G06Q 40/00 726/12 |
| 2008/0115127 A1* | 5/2008 | Hatano et al. | 718/1 |
| 2008/0222642 A1* | 9/2008 | Kakarla et al. | 718/104 |
| 2008/0250267 A1* | 10/2008 | Brown | G06F 11/1482 714/4.1 |
| 2008/0285492 A1* | 11/2008 | Vesterinen | 370/310 |
| 2009/0089406 A1* | 4/2009 | Roush | G06F 9/5077 709/220 |
| 2009/0113034 A1* | 4/2009 | Krishnappa et al. | 709/223 |
| 2009/0276771 A1* | 11/2009 | Nickolov | G06F 9/4856 717/177 |
| 2009/0327902 A1* | 12/2009 | Bethune et al. | 715/735 |
| 2009/0328024 A1* | 12/2009 | Li | G06F 11/1435 717/169 |
| 2010/0042722 A1* | 2/2010 | Klissner | 709/226 |
| 2010/0070319 A1* | 3/2010 | Prafullchandra et al. | 705/7 |
| 2010/0223366 A1* | 9/2010 | Ebreo et al. | 709/222 |
| 2010/0322255 A1* | 12/2010 | Hao et al. | 370/398 |
| 2010/0332622 A1* | 12/2010 | Carolan | G06F 9/5072 709/220 |
| 2010/0332661 A1* | 12/2010 | Tameshige | 709/226 |
| 2011/0238984 A1* | 9/2011 | Roush | G06F 21/53 713/166 |
| 2011/0289417 A1* | 11/2011 | Schaefer | G06F 11/1458 715/735 |
| 2011/0307886 A1* | 12/2011 | Thanga et al. | 718/1 |
| 2012/0185913 A1* | 7/2012 | Martinez et al. | 726/1 |
| 2012/0254858 A1* | 10/2012 | Moyers et al. | 717/177 |

* cited by examiner

100

110
Gathering network resource pre-monitoring information.

120
Performing a network resource monitoring process on the network resource based on results of the gathered network resource pre-monitoring information.

130
Analyzing the results of the network resource monitoring process.

┌─────────────────────────────────────────────────────────┐
│ 210                                                     │
│ Ascertaining if a monitoring type trigger condition exists. │
└─────────────────────────────────────────────────────────┘
                              │
┌─────────────────────────────────────────────────────────┐
│ 220                                                     │
│ Performing a corresponding type of monitoring if the    │
│ monitoring type trigger condition exists.               │
└─────────────────────────────────────────────────────────┘

FIG 2

EXCLUSIVE IP ZONE SUPPORT SYSTEMS AND METHOD

FIELD OF THE INVENTION

The present embodiments relate to the field of network resource support and management for exclusive IP zones.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. Maintaining accurate replicated backup storage of the information is often very important for a variety or reasons (e.g., disaster recovery, corruption correction, system maintenance, etc.). Various resources organized in a variety of architectures or hierarchies (e.g., virtual resources, global zones, exclusive IP zones, resource clusters, network interfaces, etc.) are often relied upon to support and manage storage of data.

Some virtualization approaches utilize a concept of zones associated with virtual machines running on a system. In some conventional approaches, each virtual machine is in a different local zone and at least one or more local zones can not access data in the other local zones. There can be a shared IP local zone in which a network interface assigned to the local zone can be shared with a global zone and possibly with one or more other shared IP zones. However, there can also be one or more zones which restrict network interface sharing with other zones. For example, an exclusive IP zone is a virtualization technique provided in some operating systems in which a network device or interface is typically exclusively accessible only in the particular local zone designated as an exclusive IP zone. However, traditionally there is usually no support of high availability (HA) cluster server environments for network interfaces associated with exclusive IP zones monitored from global zones.

Normal network resource monitoring methods valid within global/shared-IP zones often fail in the case of a network resource associated with an exclusive IP zone. Some traditional operating systems have some support for exclusive IP zones in which the exclusive-IP zone can have its own IP-related state and tuning variables, but monitoring of network resources associated with the exclusive IP zone is limited or not possible. An exclusive IP zone is usually assigned its own set of data-links when the zone is configured. Usually an interface configured in an exclusive IP zone can not be shared with any other local or global zone and conventional attempts at monitoring from a global zone do not typically work in this scenario. For example, a process running in the global zone usually cannot access required information about the network interface or data link (e.g., real time number of packets received/sent, flags/options configured for data-link, IP address assigned to an interface, etc.) in order to monitor health of the link and perform failover in case of failure. This limitation often limits or prevents high availability (HA) for such exclusive IP zone network interfaces.

SUMMARY

Network resource monitoring systems and methods are presented. In one embodiment, a network resource monitoring method comprises: gathering network resource pre-monitoring information, including information indicating whether a network resource is associated with a zone, and if associated with a zone also gathering information indicating zone type; performing a network resource monitoring process on the network resource based on results of the gathered network resource pre-monitoring information; including performing a network resource monitoring process when the network resource is in a local zone that does not otherwise make available or share information with a global zone; and analyzing the results of the network resource monitoring process. In one embodiment, if the network resource is included in an exclusive IP zone. In one exemplary implementation, the network resource monitoring process comprises: ascertaining if a monitoring type trigger condition exists; performing a corresponding type of monitoring if the monitoring type trigger condition exists.

It is appreciated that a variety of monitoring processes can be performed. The network resource monitoring process can comprise: checking the type of zone a network resource is assigned to; and performing network resource monitoring from the global zone if the network resource is assigned to a global zone or shared IP zone. The network resource monitoring process can comprise: checking the type of zone a network resource is assigned to; checking if the zone is running if the network resource is assigned to an exclusive IP zone; performing detailed monitoring of the network resource from within a local zone assigned to the exclusive IP zone if the exclusive IP zone is running; and reporting results of the monitoring back to the global zone. The network resource monitoring process can comprise: checking the type of zone a network resource is assigned to; checking if the zone is running if the network resource is assigned to an exclusive IP zone; and checking if additional IP address information is available if the exclusive IP zone is not running; plumbing the additional IP address onto a network interface associated with the network resource if additional IP address information is available, wherein the plumbing is directed from the global zone; performing pro-active monitoring of the network resource, wherein the proactive monitoring is directed from the global zone; and gathering results of the monitoring, wherein the gathering is directed from the global zone. The network resource monitoring process can comprise: checking the type of zone a network resource is assigned to; checking if the zone is running if the network resource is assigned to an exclusive IP zone; and checking if additional IP address information is available if the exclusive IP zone is not running; and performing basic monitoring of the network resource if additional IP address information is not available.

In one embodiment, a reprogrammable tangible computer readable medium having stored thereon, computer executable instructions that when executed by a computer system cause the computer system to perform a method comprising: gathering network resource pre-monitoring information, including information indicating whether a network resource is associated with a zone, and if associated with a zone also gathering information indicating zone type; performing a network resource monitoring process on the network resource based on results of the gathered network resource pre-monitoring information; including performing a network resource monitoring process when the network resource is in a local zone that does not otherwise make available or share information with a global zone; and analyzing the results of the network resource monitoring process. In one embodiment, if the network resource is included in an exclusive IP zone. In one exemplary implementation, the network resource monitoring process comprises: ascertaining if a monitoring type trigger condition exists; performing a corresponding type of monitoring if the monitoring type trigger condition exists.

It is appreciated that reprogrammable tangible computer readable medium can have a variety of exemplary implementations. The reprogrammable tangible computer readable medium comprising instructions that can cause the computer system to perform: checking the type of zone a network resource is assigned to; and performing network resource monitoring from the global zone if the network resource is assigned to a global zone or shared IP zone. The reprogrammable tangible computer readable medium comprising instructions that can cause the computer system to perform: checking the type of zone a network resource is assigned to; checking if the zone is running if the network resource is assigned to an exclusive IP zone; performing detailed monitoring of the network resource from within a local zone assigned to the exclusive IP zone if the exclusive IP zone is running; and reporting results of the monitoring back to the global zone. The reprogrammable tangible computer readable medium comprising instructions that can cause the computer system to perform: checking the type of zone a network resource is assigned to; checking if the zone is running if the network resource is assigned to an exclusive IP zone; and checking if additional IP address information is available if the exclusive IP zone is not running; plumbing the additional IP address onto a network interface associated with the network resource if additional IP address information is available, wherein the plumbing is directed from the global zone; performing pro-active monitoring of the network resource, wherein the proactive monitoring is directed from the global zone; and gathering results of the monitoring wherein the gathering is directed from the global zone. The reprogrammable tangible computer readable medium comprising instructions that can cause the computer system to perform: checking the type of zone a network resource is assigned to; checking if the zone is running if the network resource is assigned to an exclusive IP zone; and checking if additional IP address information is available if the exclusive IP zone is not running; and performing basic monitoring of the network resource if additional IP address information is not available.

In one embodiment, a computer system comprises: a processor coupled to a computer readable storage media and executing computer readable code which causes the computer system to perform operations including: gathering network resource pre-monitoring information, including information indicating whether a network resource is associated with a zone, and if associated with a zone also gathering information indicating zone type; performing a network resource monitoring process on the network resource based on results of the gathered network resource pre-monitoring information; including performing a network resource monitoring process when the network resource is in a local zone that does not otherwise make available or share information with a global zone; and analyzing the results of the network resource monitoring process. In one embodiment, if the network resource is included in an exclusive IP zone. In one exemplary implementation, the network resource monitoring process comprises: ascertaining if a monitoring type trigger condition exists; performing a corresponding type of monitoring if the monitoring type trigger condition exists.

It is appreciated that a variety of operations can be implemented on the computer systems. The computer system can perform operations comprising: checking the type of zone a network resource is assigned to; and performing network resource monitoring from the global zone if the network resource is assigned to a global zone. The computer system can perform operations comprising: checking the type of zone a network resource is assigned to; checking if the zone is running if the network resource is assigned to an exclusive IP zone; performing detailed monitoring of the network resource from within a local zone assigned to the exclusive IP zone if the exclusive IP zone is running; and reporting results of the monitoring back to the global zone. The computer system can perform operations comprising: checking the type of zone a network resource is assigned to; checking if the zone is running if the network resource is assigned to an exclusive IP zone; and checking if additional IP address information is available if the exclusive IP zone is not running; plumbing the additional IP address onto a network interface associated with the network resource if additional IP address information is available, wherein the plumbing is directed from the global zone; performing pro-active monitoring of the network resource, wherein the proactive monitoring is directed from the global zone; and gathering results of the monitoring, wherein the gathering is directed from the global zone. The computer system can perform operations comprising: checking the type of zone a network resource is assigned to; checking if the zone is running if the network resource is assigned to an exclusive IP zone; and checking if additional IP address information is available if the exclusive IP zone is not running; and performing basic monitoring of the network resource if additional IP address information is not available.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 1 is a block diagram of an exemplary network resource monitoring method in accordance with one embodiment of the present invention.

FIG. 2 is a block diagram of an exemplary network resource monitoring process in accordance with one embodiment of the present invention.

DETAILED DESCRIPTION

Figure 3:
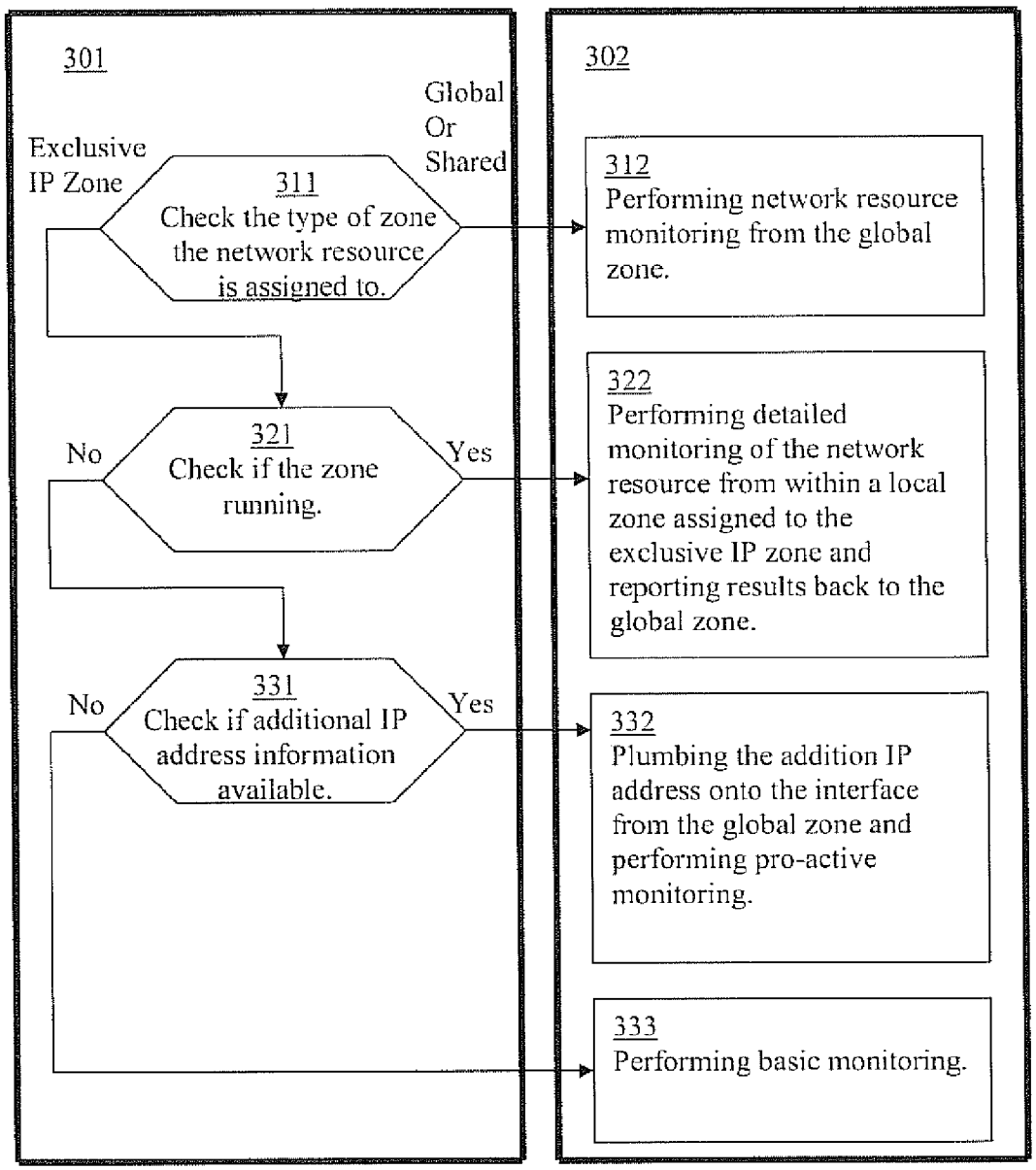
FIG. 3 is a block diagram of an exemplary network resource monitoring process in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

Systems and methods are presented that facilitate efficient and effective support (e.g., management, monitoring, etc.) of network resources associated with exclusive IP zones. In one embodiment, the present systems and methods help manage and monitor availability of exclusive IP zones in cluster server environments. In one exemplary implementation, the present approach helps manage indications of availability of exclusive IP zones (e.g., including the local zone is running, halted, detached, etc.) in cluster server environments. A cluster server can include high availability software that can monitor and manage various types of resources. In one embodiment, a cluster server schedules a monitor cycle to periodically check health of a network resource (e.g. NIC resource, IP resource, etc.). The monitor process can run in a global zone. If a resource is configured for an exclusive IP zone the present systems and methods can enable the monitor process running in the global zone to retrieve monitoring related information regarding the network resource configured for the exclusive IP zone. The way in which the monitoring related information is retrieved can be based upon an exclusive IP zone scenario or characteristics. Additional description of exclusive IP zone network resource support and monitoring is set forth in following sections of the detailed description.

Various resources organized in a variety of architectures or hierarchies (e.g., virtual resources, global zones, shared IP zones, exclusive IP zones, resource clusters, network interfaces, etc.) are often relied upon to support and manage storage and replication of data. In general, there can be different types of clusters, such as, for example, compute clusters, storage clusters, scalable clusters, and the like. High-availability clusters (also known as HA Clusters or Failover Clusters) are typically clusters of node resources (e.g., computers, networks, applications, virtual components, servers, data storage, etc.) that are implemented primarily for the purpose of providing high availability of services. They usually operate by having redundant components or nodes that can be utilized to provide service in various scenarios (e.g., when system components fail, a maintenance shutdown of a certain portion, minimizing single points of failure, etc.). The clusters can often be utilized to minimize data loss and implement DR (disaster recovery) quickly. In one embodiment, the data can be stored at one or more resources communicatively coupled by a network and periodic replication is utilized to minimize data loss and improve the availability of data. Monitoring the condition or health of network resources, including network interfaces, can provide important information regarding the ability of information to be communicatively coupled to different components of the data storage and replication system.

FIG. 1 is a block diagram of exemplary network resource monitoring method 100 in accordance with one embodiment of the present invention. In one embodiment, network resource monitoring method 100 is utilized to perform monitoring of network resources in an exclusive IP zone.

In block 110, network resource pre-monitoring information is gathered. In one embodiment, the network resource pre-monitoring information includes information about or associated with a network resource prior to initiation of network resource monitoring. The network resource pre-monitoring information can include an indication of whether the network resource is associated with a zone, and if associated with a zone the gathered information can also include various characteristics or features of the zone. The information regarding various characteristics or features of the zone can include an indication of the zone type or configuration (e.g., a global zone, shared IP zone, exclusive IP zone, etc). The information regarding various characteristics or features of the zone can include if a zone is running or not. Additional description on exemplary gathering network resource pre-monitoring information is set forth in following sections of the detailed description.

In block 120, a network resource monitoring process is performed on the network resource based on results of the gathered network resource pre-monitoring information. It is appreciated that a variety network resource monitoring processes can be performed. In one embodiment, a network resource is monitored from the global zone. A network resource can be monitored from the global zone when the information about the network resource is available from the global zone. In one exemplary implementation, the information gathered in block 220 indicates the zone associated with a network resource is a global zone or shared IP zone and the information about the network resource is available from the global zone. In one embodiment, a network resource can be monitored and reported back to the global zone even when the information about the network resource is not otherwise available from the global zone. Information about the network resource may not be available in a variety of situations, including when the network resource is in a local zone that does not otherwise make available or share information with a global zone (e.g., an exclusive IP zone, etc.). In one exemplary implementation, the type of monitoring (e.g., detailed, pro-active, shallow, etc.) performed when the information about the network resource is not available from the global zone is based upon one of a possible plurality of scenarios (e.g., the zone is running, the zone is not running and additional IP address information is available, the zone is not running and additional IP address information is not available, etc.). Addition description of exemplary network resource monitoring is set forth in following sections of the detailed description.

In block 130, the results of the network resource monitoring process performed in block 120 are analyzed. In one embodiment, the results of the network resource monitoring process performed in block 120 are analyzed to determine the health of the network resource. In one embodiment, if the monitoring process includes one or more test(s) and the results are completed successfully or positively then the interface is declared or designated on line or healthy, and if the results are not completed successfully or positively then the interface is declared or designated unhealthy or off line. In one exemplary implementation, the results of the monitoring process performed in block 220 are also forwarded to the global zone. Addition description on results of the monitoring is set forth in following sections of the detailed description In one embodiment, the present invention approach helps manage availability of exclusive IP zones in cluster server environments (e.g., a local zone is running, halted, detached, etc.). A cluster server can include high availability software that can monitor and manage various types of resources. In one embodiment, a cluster server schedules a monitor cycle to periodically check health of a resource (e.g. NIC resource, IP resource, etc.). The monitor process can run in a global zone. In one exemplary implementation, if a resource is configured for exclusive IP zone (e.g., this can be checked by referring to resource attribute, etc.) a present invention system/method can enable the monitor process running in the global zone to retrieve monitoring related information regarding the resource configured for the exclusive IP zone. The way in which the monitoring related information is retrieved is based upon characteristics and features of the zone (e.g., the zone is a global zone, the zone exclusive IP zone, the zone is running, not running, additional IP address information is available, is not available, etc.).

FIG. 2 is a block diagram of exemplary network resource monitoring process 200 in accordance with one embodiment of the present invention. In one embodiment, network resource monitoring process 200 is similar to a network resource monitoring process performed in block 120.

In block 210, the process includes ascertaining if a monitoring type trigger condition exists. In one embodiment, the monitoring type trigger condition corresponds to a monitoring environment scenario. In one exemplary implementation, a monitoring environment scenario can be ascertained by analyzing gathered pre-monitoring information (e.g., information gathered in block 110, etc.). A monitoring environment scenario can include a network resource is included in a particular type of zone (e.g., a global zone, shared IP zone, exclusive IP zone, etc.). A monitoring environment scenario can include the network resource is included in a zone that is running or not running. A monitoring environment scenario can include additional information is available that allows login to a zone.

In block 220, a corresponding type of monitoring is performed if the monitoring type trigger condition exists. It is appreciated that various types of monitoring can be performed (e.g., detailed monitoring, pro-active monitoring, shallow monitoring, etc.) depending upon monitoring type trigger condition. Additional description of exemplary network resource monitoring is set forth in following sections of the detailed description.

FIG. 3 is a block diagram of exemplary network resource monitoring process 300 in accordance with one embodiment of the present invention. In one embodiment, network resource monitoring process 300 is similar to network resource monitoring process 200.

In block 310, the type of zone a network resource is assigned to is checked. If the type of zone a network resource is assigned to is an exclusive IP zone the process proceeds to block 321. If the type of zone a network resource is assigned to is a global zone or shared IP zone the process proceeds to block 312.

In block 312, network resource monitoring is performed from the global zone.

Whether the exclusive IP zone is running or not is checked in block 321. If the exclusive IP zone is running the process proceeds to block 322. If the exclusive IP zone is not running the process proceeds to block 331.

In block 322, detailed monitoring of the network resource is performed from within a local zone assigned to the exclusive IP zone. In one exemplary implementation, results of the monitoring are reported back to the global zone. In one embodiment, a login to the local zone associated with the exclusive IP zone is performed from the global zone. In one embodiment, the monitoring process is invoked from within the local zone assigned to the exclusive IP zone. The monitor process inside local zone can be invoked with required information (e.g., device to be monitored, IP protocol for which monitoring needs to be done, etc.). This monitoring can run as a standalone process inside the local zone and gather the information associated with checking the health of the resource (e.g., information associated with a NIC viz. runtime flags of the NIC, incoming packet count for the NIC, etc.). In one embodiment, the monitor process makes a decision about the health of the device or resource based on the results or information gathered by the monitoring. This decision can be communicated back to the monitor process running in the global zone which in turn can report the state of the resource to the user. This process of monitoring from inside the local zone can be called detailed monitoring or real monitoring.

In block 331, the availability of additional IP address information is checked. In one embodiment, the additional IP address information is associated with the network resource to be monitored. If the additional IP address information is available the process proceeds to block 332. If the additional IP address information is not available the process proceeds to block 333.

In block 332, the additional IP address is plumbed onto the interface from the global zone and pro-active monitoring is performed. In one embodiment, the system is configured for proactive monitoring. Being configured for proactive monitoring can include having additional IP address information available to a cluster server. In one exemplary implementation, the additional IP address is one that is not used elsewhere and will not corrupt routing tables. The additional IP address can be an address that should be pinged in order to check on or retrieve information on the network resource to be monitored (e.g., health of an interface, etc.). The additional IP address information can be provided by a variety of mechanisms (e.g., from a user, automatically generated or retrieved, etc.). In one embodiment, the IP address is plumbed into the interface or resource in the global zone. In one exemplary implementation, a monitoring process running in the global zone pings the interface at the additional IP address with one or more tests and if the test(s) results indicate the interface successfully completed or passed the tests then the interface is declared or designated healthy and if the test(s) results indicate the interface did not successfully complete or passed the tests then the interface is declared unhealthy or off line.

In block 333, basic monitoring is performed. Traditionally, there was typically no way to get runtime data, like flags. In one embodiment, basic monitoring is done from global zone itself. In one exemplary scenario where hardware itself does not exists on the system or hardware is not connected (e.g., a network cable is not connected to the interface, etc.), basic monitoring can report the issue to the user. Such monitoring from a global zone can be called basic monitoring or shallow monitoring. In one exemplary implementation of basic monitoring, if the last real monitoring reported a fault and real monitoring cannot be done (e.g., because zone is not in running state, etc.), basic monitoring will keep reporting a fault. This ensures that user is notified of faults which cannot be detected by basic monitoring. In one exemplary situation, a user is expected to resolve the issue with the hardware and notify a global monitor (e.g., a trigger/action entry point is provided to user for this purpose, etc.), after which normal monitoring can follow.

Some virtualization approaches utilize a concept of zones associated with virtual machines running on a system. In some conventional approaches, each virtual machine is in a different local zone and at least one or more local zones can not access data in the other local zones. There can be a shared IP zone in which a network interface assigned to the shared IP zone can be shared across one or more zones (e.g., a global zone, multiple shared IP zones, etc.). However, there can also be one or more zones which restrict data sharing with other zones. For example, an exclusive IP zone is a virtualization technique provided in some operating systems in which a network device or interface is typically only exclusively accessible only in the particular local zone designated as an exclusive IP zone.

Some information storage systems utilize cluster server environments to help store and maintain information. However, traditionally there is usually not support in global zones of high availability (HA) cluster server environments for network interfaces associated with exclusive IP zones. Normal network resource monitoring methods valid within global/shared-IP zones that do not include systems and methods similar to those in the present detailed description typically otherwise fail in the case of a network resource associated with an exclusive IP zone. Some traditional operating systems have some support for exclusive IP zones in which the exclusive-IP zone can have its own IP-related state and tuning variables. The exclusive IP zone is assigned its own set of data-links when the zone is configured. Usually an interface configured in exclusive IP zone can not be shared with any other local or global zone. Conventional attempts at monitoring network resources assigned to the exclusive IP zone from a global zone do not typically otherwise work in this scenario. For example, a process running in the global zone usually cannot access required information about the data link (e.g., real time number of packets received/sent, flags/options configured for data-link, IP address assigned to an interface, etc.) in order to monitor health of the link and perform failover in case of failure. This limitation typically prevents providing high availability (HA) for such interfaces in environments that do not include systems and methods similar to those described in the present detailed description. Systems and methods similar to those described in the present detailed description can facilitate providing high availability (HA) for such network interfaces in environments with exclusive IP zones.

Figure 4:
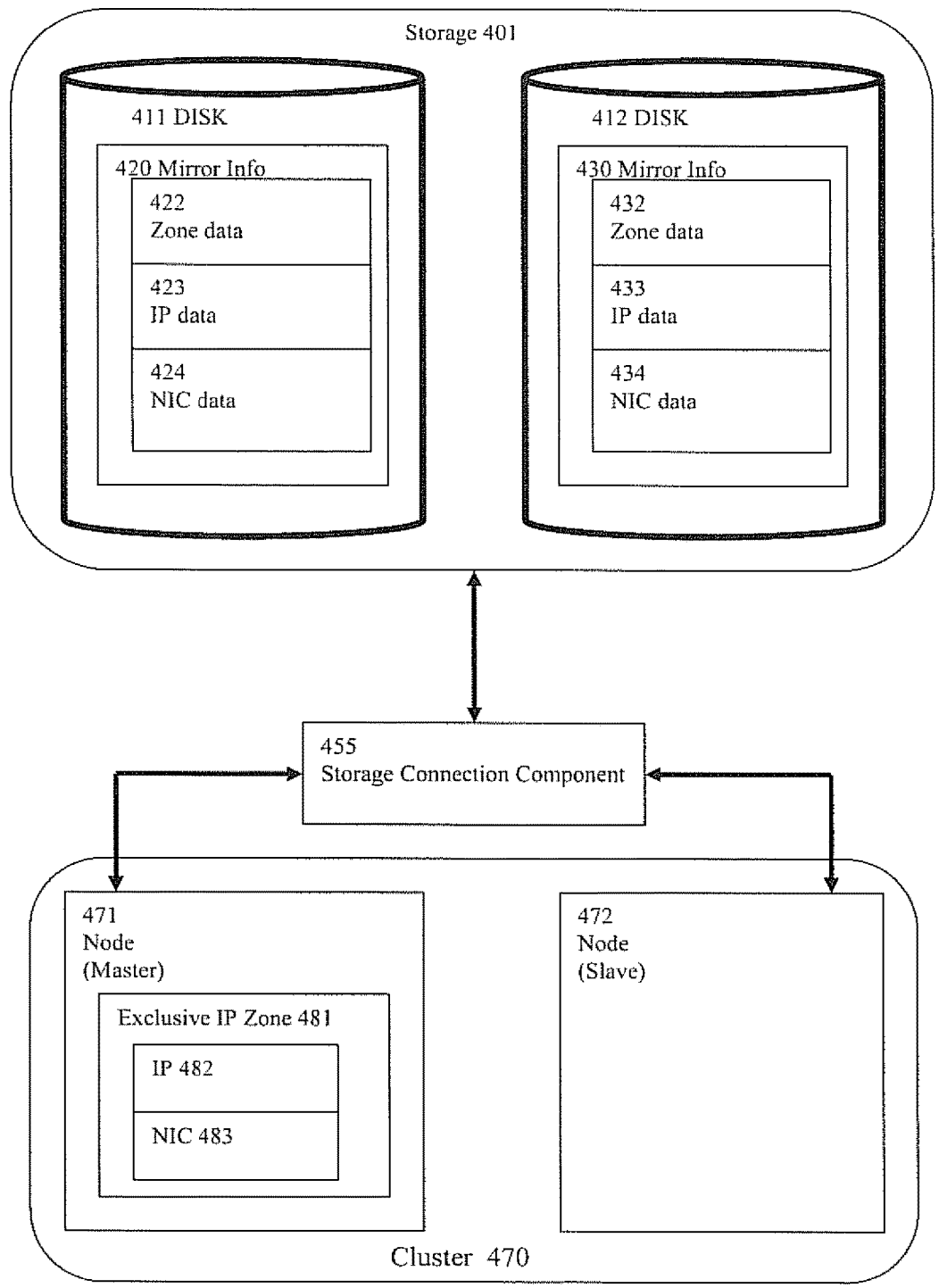
FIG. 4 is a block diagram of an exemplary data storage system in accordance with one embodiment of the present invention.

FIG. 4 is a block diagram of exemplary data storage system 400 in accordance with one embodiment of the present invention. Data storage system 400 includes storage resource 401, storage connection component 455 and cluster 470. Cluster 470 includes nodes 471, and 472. Nodes 471 and 172 can operate as hosts. In one exemplary implementation, node 471 acts as a master node running exclusive IP zone 481, IP 482 and NIC 483. Storage connection component 455 provides a connection between nodes cluster 470 and storage resources 401. In one embodiment, storage connection component 455 includes a storage array network (SAN) switch. Storage resource 401 includes disks 411 and 412 that store mirror information. Mirror information 420 includes zone data 422, IP data 423, and NIC data 424 stored on disk 411 corresponding to exclusive IP zone 481, IP 482 and NIC 483. Mirror information 430 includes zone data 432, IP data 433, and NIC data 434 stored on disk 412 which also corresponding to exclusive IP zone 481, IP 482 and NIC 483. In one embodiment, a mirror is implemented in a virtual level and the mirror volume is shared across multiple nodes (e.g., in a shared cluster, in cluster 470, etc.).

The components of exemplary data storage system 400 cooperatively operate to facilitate efficient and convenient storage of data information. In one embodiment, disks 411 and 412 store information in a mirror configuration and information stored on one mirror is duplicated or "mirrored" on the other mirrors. In one exemplary implementation, zone data 422 is the same as respective zone data 432, IP data 423 is the same as respective IP data 433 and NIC data 424 is the same as respective NIC data 434. It is appreciated that the present systems and methods are readily configurable for implementation in a variety of arrangements or organization. A mirror can utilize resources on multiple disks. It is also appreciated that disk resources can be utilized by multiple mirrors. In one embodiment, blocks of storage resources on a disk can be assigned to one mirror and other blocks of storage resources on the same disk can be assigned to another mirror.

Figure 5:
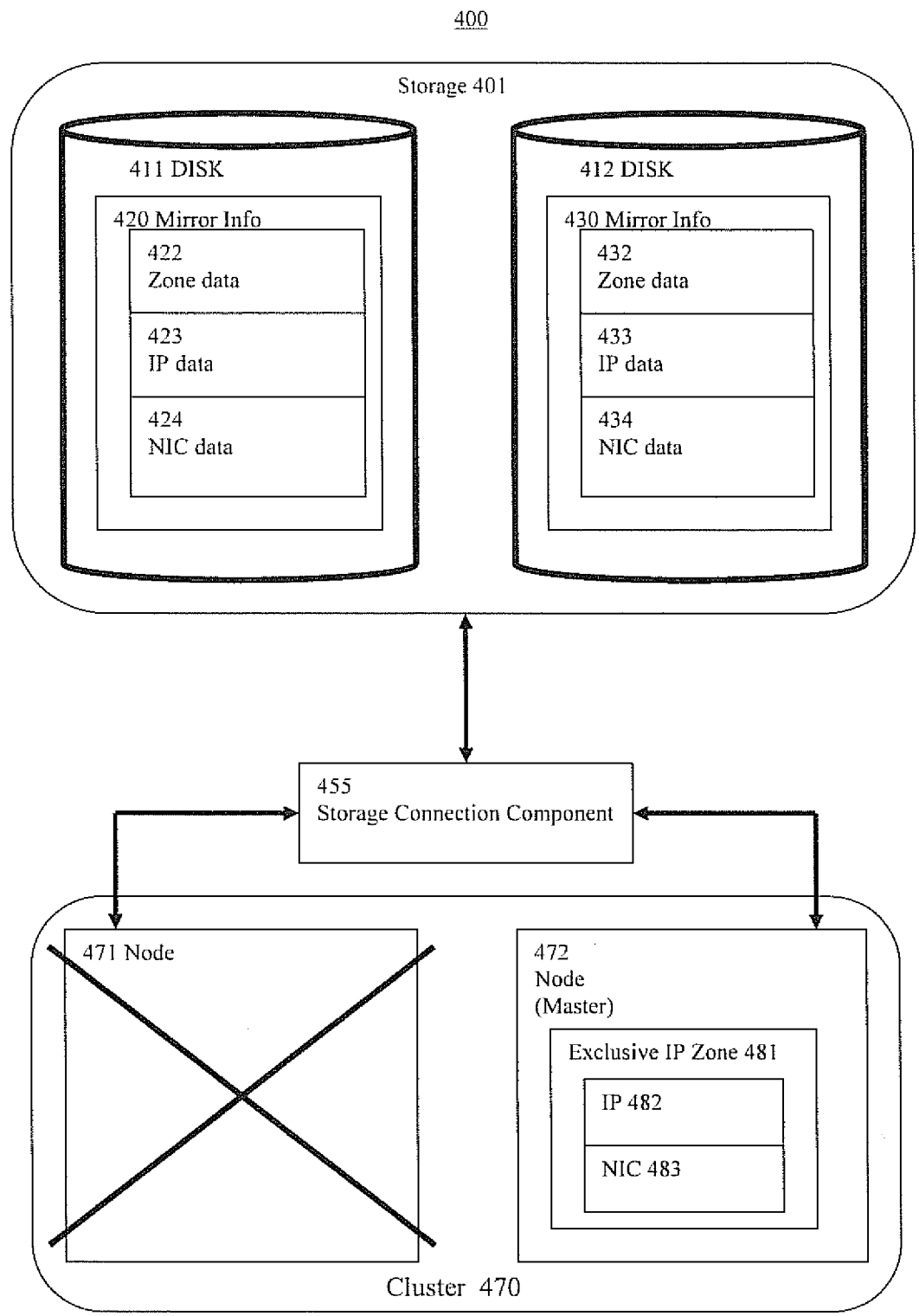
FIG. 5 is block diagram of an exemplary data storage system after a node fail over in accordance with one embodiment of the present invention.

Without the exclusive IP zone support and monitoring systems and methods described in the present detailed description, the NIC 483 associated with or inside the local zone corresponding to exclusive IP zone 481 can be monitored on node 471, whereas on the node 472 the NIC 483 can not be monitored and is reported as faulted, thus basically eliminating node 472 as an eligible fail over node for the service group if node 471 fails. However, the exclusive IP zone support and monitoring systems and methods described in the present detailed description enable the NIC 483 to be monitored in a manner that can prevent incorrect or inappropriate persistent reporting of the NIC 483 as FAULTED in a situation where the local zone associated with exclusive IP zone 481 is not running on node 472. In one embodiment, monitoring (e.g., basic monitoring, real monitoring, etc.) is performed for the NIC 483 resource and if the monitoring returns successful or positive results the NIC 483 resource can be reported as ONLINE for node 471 and node 472 both (e.g., as opposed to FAULTED state that a traditional approach would otherwise report, etc.) allowing the node 472 to be marked as a potential candidate for failover if node 471 fails. FIG. 5 is block diagram of exemplary data storage system 400 after a node fail over in accordance with one embodiment of the present invention. In FIG. 5, node 471 fails and a successfully failover to enable running of exclusive IP zone 481, IP 482 and NIC 483 on node 472 is performed.

While the preceding explanations are primarily directed in some examples to NIC and IP resources that are supported for exclusive IP zone, it is appreciated that the present approach can be utilized to support a variety of other networking resources.

Figure 6:
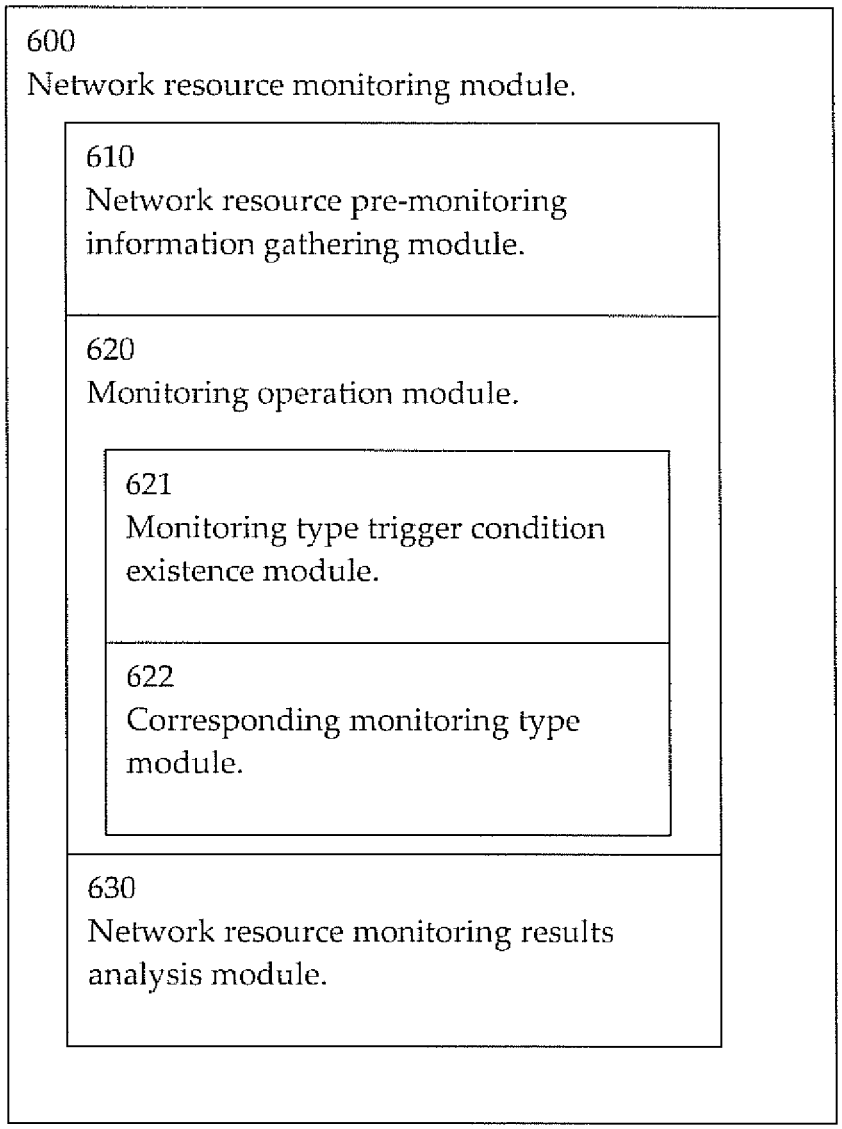
FIG. 6 is a block diagram of an exemplary network resource monitoring module which includes instructions for directing a processor in the performance of a network resource monitoring method in accordance with one embodiment of the present invention.

FIG. 6 is a block diagram of network resource monitoring module 600 which includes instructions for directing a processor in the performance of a network resource monitoring method (e.g., network resource monitoring method 100, etc.) in accordance with one embodiment of the present invention. Network resource monitoring module 600 includes network resource pre-monitoring information gathering module 610, monitoring operation module 620 and network resource monitoring results analysis module 630. Monitoring operation module 620 includes monitoring type trigger condition existence module 621 and corresponding monitoring type module 622. Network resource pre-monitoring information gathering module 610 includes instructions for performing network resource pre-monitoring information gathering. In one embodiment, Network resource pre-monitoring information gathering module 610 includes instructions for performing network resource pre-monitoring information gathering operations as indicated in block 110. Monitoring operation module 620 includes instructions for performing Monitoring operations. In one embodiment, monitoring operation module includes instructions for performing operations as indicated in block 120. Monitoring type trigger condition existence module 621 includes instructions for performing monitoring type trigger condition existence operations. In one embodiment, monitoring type trigger condition existence module 621 includes instructions for performing monitoring type trigger condition existence module operations as indicated in block 210. Corresponding monitoring type module 622 includes instructions for performing corresponding monitoring type operations. In one embodiment, corresponding monitoring type module 622 includes instructions for performing operations as indicated in block 220. Network resource monitoring results analysis module 630 includes instructions for performing network resource monitoring results analysis operations. In one embodiment, network resource monitoring results analysis module includes instructions for performing operations as indicated in block 130.

Figure 7:
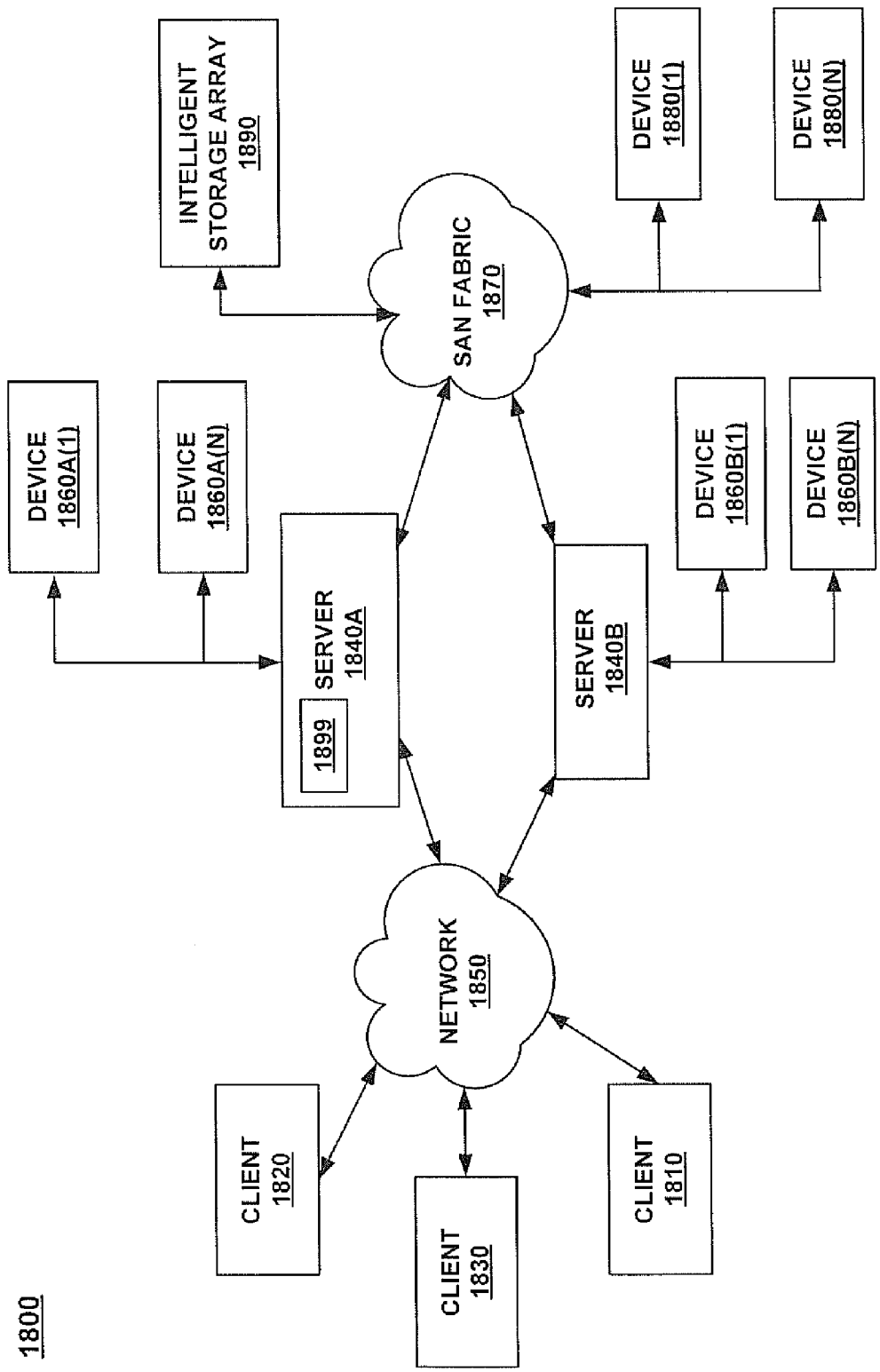
FIG. 7 is a block diagram depicting an exemplary network architecture in accordance with one embodiment of the present invention.

It is appreciated present network resource monitoring systems and methods can be implemented as part of a variety of environments. For example, network resource monitoring systems and methods can be implemented as part of a distributed computing environment, a cloud computing environment, a virtual environment, a client server environment, etc. In one embodiment, a network resource monitoring method (e.g., network resource monitoring method 100, etc.) can be implemented on a network. FIG. 7 is a block diagram depicting a network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes monitoring module 1899. In one embodiment, a monitoring module 1899 is similar to monitoring module 600. It is appreciated that present systems and methods are compatible with a variety of implementations. For example, portions of information and instructions associated with can be distributed in various resources.

Figure 8:
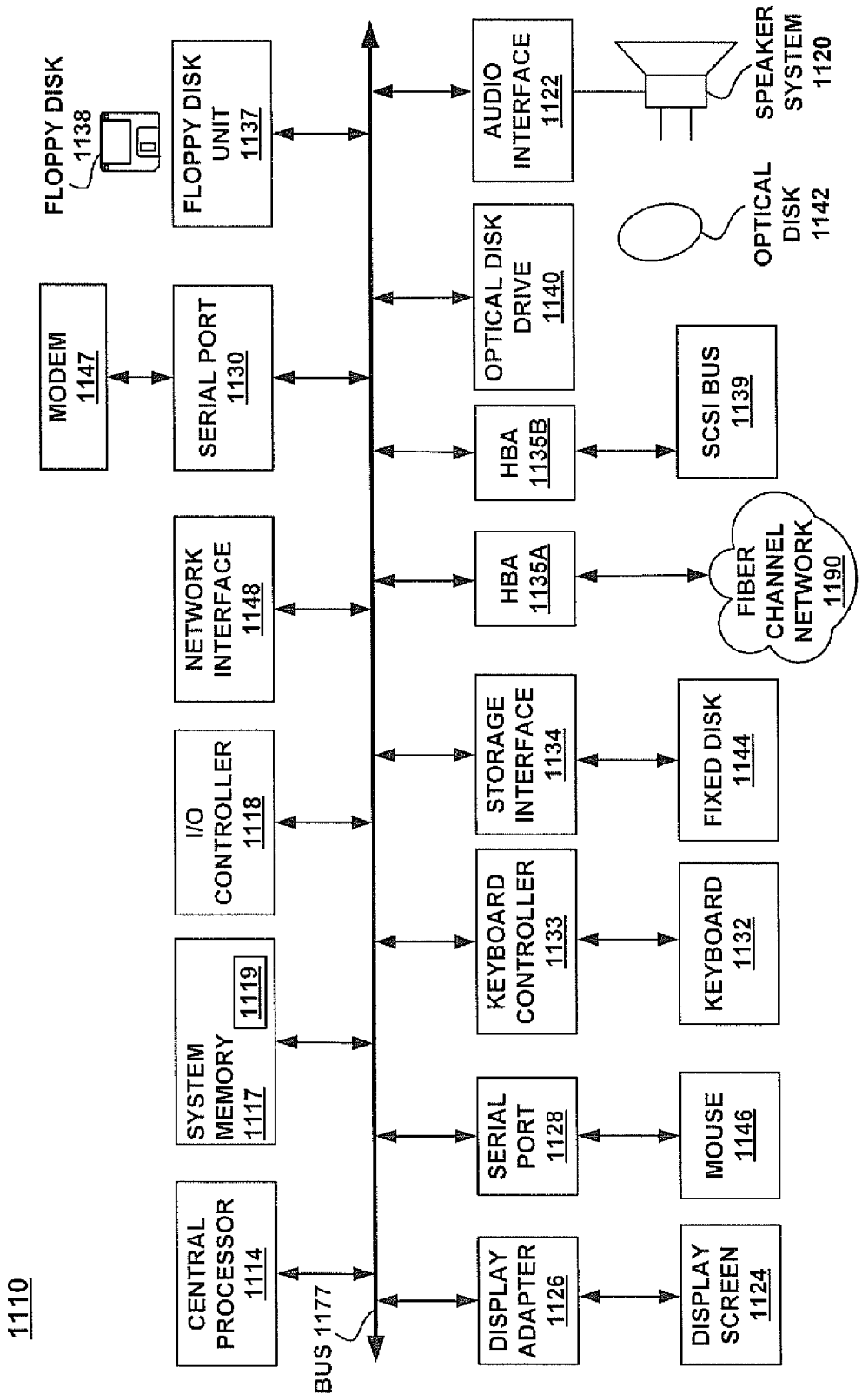
FIG. 8 depicts a block diagram of an exemplary computer system in accordance with one embodiment of the present invention.

FIG. 8 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing a monitor method (e.g., similar monitoring module 300, etc.) are stored in one or more memories of computer system 1100 (e.g., in memory location 1119). The RAM is generally the main memory into which the operating system and application programs are loaded. In one embodiment, RAM 1117 includes an application service resource switchover module (e.g., in memory location 1119). In one embodiment, an application service resource switchover module stored in memory location 1119 is similar to application dedicated registry hive module 800. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified)

between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 7 depicts the use of a network such as the Internet for exchanging data, but the present disclosure is not limited to the Internet or any particular network-based environment.

Thus, the present systems and methods facilitate efficient and effective network resource monitoring. Unlike conventional attempts that have limited or no exclusive IP zone network resource monitoring, systems and methods similar to those included in the present detailed description can facilitate exclusive IP zone network resource monitoring.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:
1. A network interface monitoring method comprising:
gathering pre-monitoring information for a network interface indicating virtualization zone type information for a zone that the network interface is associated with, wherein the virtualization zone type information contains information regarding whether a node unassociated with the zone may access the network interface, and wherein the node unassociated with the zone and a node associated with the zone that the network inter- face is associated with are members of a cluster comprising a plurality of nodes;

performing a monitoring process on the network interface based on the virtualization zone type information, including performing, in a global zone, a monitoring process when the network interface is in a local zone that does not otherwise make available or share information with the global zone, wherein the local zone and global zone are configured to be run by members of the cluster;

storing, on a first disk, zone data, IP data, and network interface controller data associated with a master node and a slave node within the local zone;

storing, on a second disk, the zone data, the IP data, and the network interface controller data associated with the master node and the slave node within the local zone; and analyzing results of the monitoring process to determine the health of the network interface, wherein the monitoring process comprises:

checking the type of zone the network interface is assigned to; and performing monitoring from the global zone if the network interface is assigned to a global zone.

2. The network interface monitoring method of claim 1 wherein the network interface is included in an exclusive IP zone.

3. The network interface monitoring method of claim 1 wherein the monitoring process comprises:

ascertaining if a monitoring type trigger condition exists; and performing a corresponding type of monitoring if the monitoring type trigger condition exists.

4. The network interface monitoring method of claim 1 wherein the monitoring process comprises:

checking the type of zone the network interface is assigned to;

checking if the zone is running if the network interface is assigned to an exclusive IP zone;

performing detailed monitoring of the network interface from within a local zone assigned to the exclusive IP zone if the exclusive IP zone is running; and reporting results of the monitoring back to the global zone.

5. The network interface monitoring method of claim 1 wherein the monitoring process comprises:

checking the type of zone the network interface is assigned to;

checking if the zone is running if the network interface is assigned to an exclusive IP zone;

checking if additional IP address information is available if the exclusive IP zone is not running;

plumbing the additional IP address onto the network interface if additional IP address information is available, wherein the plumbing is directed from the global zone;

performing pro-active monitoring of the network interface, wherein the proactive monitoring is directed from the global zone; and gathering results of the monitoring, wherein the gathering is directed from the global zone.

6. The network interface monitoring method of claim 1 wherein the monitoring process comprises:

checking the type of zone a network interface is assigned to;

checking if the zone is running if the network interface is assigned to an exclusive IP zone;

checking if additional IP address information is available if the exclusive IP zone is not running; and performing basic monitoring of the network interface if additional IP address information is not available.

7. A reprogrammable non-transitory computer readable medium having stored thereon computer executable instructions that, when executed by a computer system, cause the computer system to perform a method comprising:

gathering pre-monitoring information for a network interface, indicating virtualization zone type information for a zone that the network interface is associated with, wherein the virtualization zone type information contains information regarding whether a node unassociated with the zone may access the network interface and wherein the node unassociated with the zone and a node associated with the zone that the network interface is associated with are members of a cluster comprising a plurality of nodes;

performing a monitoring process on the network interface based on the virtualization zone type information, including performing, in a global zone, a network interface monitoring process when the network interface is in a local zone that does not otherwise make available or share information with the global zone, wherein the local zone and global zone are configured to be run by members of the cluster;

storing, on a first disk, zone data, IP data, and network interface controller data associated with a master node and a slave node within the local zone;

storing, on a second disk, the zone data, the IP data, and the network interface controller data associated with the master node and the slave node within the local zone; and analyzing results of the monitoring process to determine the health of the network interface, wherein the monitoring process comprises:

checking the type of zone the network interface is assigned to; and performing monitoring from the global zone if the network interface is assigned to a global zone.

8. The reprogrammable non-transitory computer readable medium of claim 7 wherein the network interface is included in an exclusive IP zone.

9. The reprogrammable non-transitory computer readable medium of claim 7 wherein the monitoring process comprises:

ascertaining if a monitoring type trigger condition exists; and performing a corresponding type of monitoring if the monitoring type trigger condition exists.

10. The reprogrammable non-transitory computer readable medium of claim 7 wherein the monitoring process comprises:

checking the type of zone the network interface is assigned to;

checking if the zone is running if the network interface is assigned to an exclusive IP zone;

performing detailed monitoring of the network interface from within a local zone assigned to the exclusive IP zone if the exclusive IP zone is running; and reporting results of the monitoring back to the global zone.

11. The reprogrammable non-transitory computer readable medium of claim 7 wherein the monitoring process comprises:

checking the type of zone the network interface is assigned to;

checking if the zone is running if the network interface is assigned to an exclusive IP zone;

checking if additional IP address information is available if the exclusive IP zone is not running;

plumbing the additional IP address onto the network interface if additional IP address information is available, wherein the plumbing is directed from the global zone;

performing pro-active monitoring of the network interface, wherein the proactive monitoring is directed from the global zone; and gathering results of the monitoring, wherein the gathering is directed from the global zone.

12. The reprogrammable non-transitory computer readable medium of claim 7 wherein the monitoring process comprises:

checking the type of zone a network interface is assigned to;

checking if the zone is running if the network interface is assigned to an exclusive IP zone;

checking if additional IP address information is available if the exclusive IP zone is not running; and performing basic monitoring of the network interface if additional IP address information is not available.

13. A computer system comprising:

a cluster comprising a plurality of nodes including a node associated with a zone a network interface is associated with and a node unassociated with the zone; and a processor coupled to a computer readable storage media and executing computer readable code which causes the computer system to perform operations including:

gathering pre-monitoring information for the network interface indicating virtualization zone type information for the zone that the network interface is associated with, wherein the virtualization zone type information contains information regarding whether the node unassociated with the zone may access the network interface;

performing a monitoring process on the network interface based on the virtualization zone type information, including performing, in a global zone, a monitoring process when the network interface is in a local zone that does not otherwise make available or share information with the global zone, wherein the local zone and global zone are configured to be run by nodes that are members of the cluster;

storing, on a first disk, zone data, IP data, and network interface controller data associated with a master node and a slave node within the local zone;

storing, on a second disk, the zone data, the IP data, and the network interface controller data associated with the master node and the slave node within the local zone; and analyzing results of the monitoring process to determine the health of the network interface, wherein the monitoring process comprises:

checking the type of zone the network interface is assigned to; and performing monitoring from the global zone if the network interface is assigned to a global zone.

14. The computer system of claim 13 wherein the network interface is included in an exclusive IP zone.

15. The computer system of claim 13 wherein the monitoring process comprises:

ascertaining if a monitoring type trigger condition exists; and performing a corresponding type of monitoring if the monitoring type trigger condition exists.

16. The computer system of claim 13 wherein the monitoring process comprises:

checking the type of zone the network interface is assigned to;

checking if the zone is running if the network interface is assigned to an exclusive IP zone;

performing detailed monitoring of the network interface from within a local zone assigned to the exclusive IP zone if the exclusive IP zone is running; and reporting results of the monitoring back to the global zone.

17. The computer system of claim 13 wherein the monitoring process comprises:

checking the type of zone the network interface is assigned to;

checking if the zone is running if the network interface is assigned to an exclusive IP zone;

checking if additional IP address information is available if the exclusive IP zone is not running;

plumbing the additional IP address onto the network interface if additional IP address information is available, wherein the plumbing is directed from the global zone;

performing pro-active monitoring of the network interface, wherein the proactive monitoring is directed from the global zone; and gathering results of the monitoring, wherein the gathering is directed from the global zone.

18. The computer system of claim 13 wherein the monitoring process comprises:

checking the type of zone the network interface is assigned to;

checking if the zone is running if the network interface is assigned to an exclusive IP zone;

checking if additional IP address information is available if the exclusive IP zone is not running; and performing basic monitoring of the network interface if additional IP address information is not available.

* * * * *